United States Patent
Allard et al.

[15] 3,694,653
[45] Sept. 26, 1972

[54] X-RAY FILM CASSETTE HOLDER

[72] Inventors: Charles D. Allard, San Leandro; Eugene R. Allard, Alameda, both of Calif.

[73] Assignee: Sana Products, Inc., San Leandro, Calif.

[22] Filed: Nov. 4, 1971

[21] Appl. No.: 195,741

Related U.S. Application Data

[63] Continuation-in-part of Ser. No. 863,649, Oct. 3, 1969, Pat. No. 3,626,186.

[52] U.S. Cl. .....................250/50, 211/89, 248/476, 250/58, 250/59
[51] Int. Cl. ..............................................G01n 21/00
[58] Field of Search.....40/152.1; 211/89; 248/316 R, 248/476; 250/50, 57, 58, 55 R, 59

[56] References Cited

UNITED STATES PATENTS 2,921,202  1/1960  Berger et al. ............250/58 X
3,051,832  8/1962  Pigg, Sr. .....................250/50
3,231,230  1/1966  Mueller .................248/476 X
3,370,822  2/1968  Miller........................248/476
3,633,028  1/1972  Marino.......................250/50

Primary Examiner—William F. Lindquist
Attorney—James R. Cypher

[57] ABSTRACT

An X-ray film cassette holder for releasable mounting on a portable wheeled patient carrier or for mounting on a wall consisting essentially of a frame, a pair of elongated members mounted on the frame, a first slide member for engaging the top of the cassette and a second slide member for engaging the bottom of the cassette, and a locking means carried by the second slide member consisting of pivoting arms which lockingly engage the elongated members in one position and are moveable to another position permitting sliding of the slide members upon the elongated members.

7 Claims, 5 Drawing Figures

INVENTORS:
CHARLES D. ALLARD
EUGENE R. ALLARD
BY: *James R. Gopher*
HIS ATTORNEY

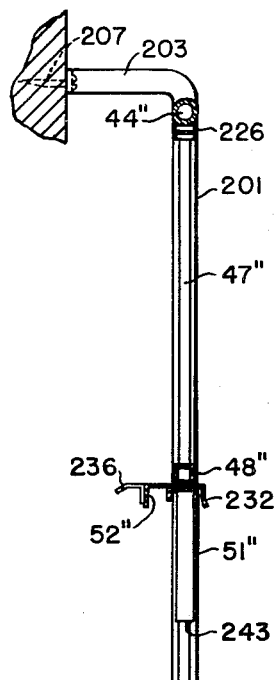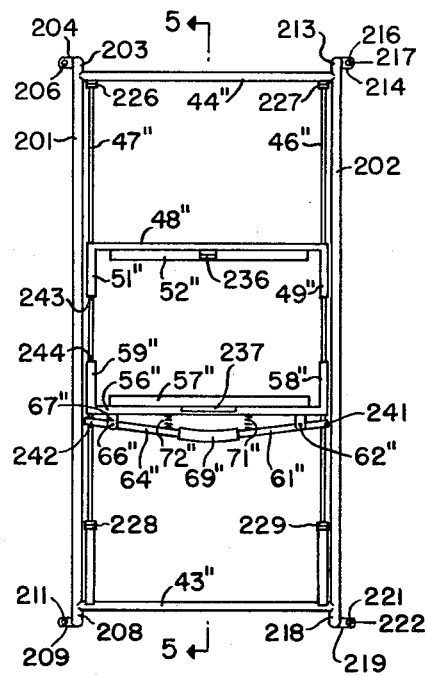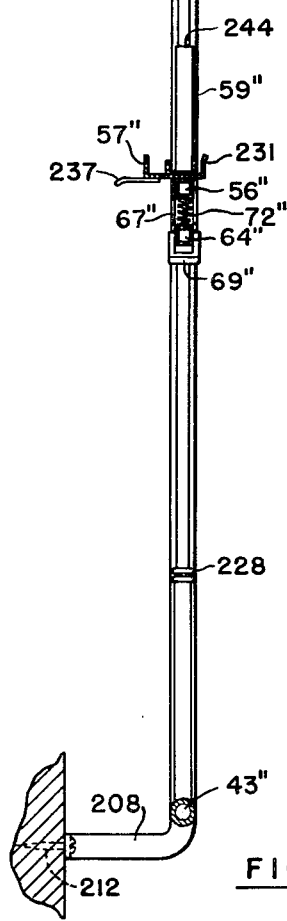

X-RAY FILM CASSETTE HOLDER

BACKGROUND OF THE INVENTION

This is a continuation-in-part of application Ser. No 863,649 filed Oct. 3, 1969, now U.S. Pat. No. 3,626,186. A requirement for restriction was made in the said application. This application makes no claim to the Mobile X-Ray Chair which is claimed in the earlier filed application.

Present X-ray film cassette holders are either an integral part of an X-ray table or a part of a fixed wall mounted installation. The present wall mounted cassettes require two hands to operate the locking slide mechanism. In Applicant's patent application referred to above, a new type X-ray chair was developed. Existing cassette holders were not suitable or adaptable to this chair.

SUMMARY OF THE INVENTION

The gist of the present invention is a uniquely designed film cassette holder that can be used with the chain above referred to and with a slight modification can be attached to a wall for taking pictures with the patient standing or seated against the wall. Both of the cassettes can be operated with one hand thus permitting the films to be inserted and removed more easily from the holder and allowing easier adjustment of the position of the film in relation to the holder.

An object of the present invention is to provide a cassette holder which, with little modification can be used on a mobile chair or attached to a wall.

A further object is to provide a cassette holder which can be constructed from a few sturdy parts which require a minimum of maintenance.

Another object is to provide an inexpensive piece of equipment which will permit x-rays to be taken more quickly by providing quicker and easier unloading of the cassettes.

Still another object is to provide a holder which will handle all types of grids.

BRIEF DESCRIPTION OF THE DRAWINGS:

FIG. 4 is a rear view of a modified form of the invention for mounting on a wall.

FIG. 5 is a cross sectional view of the device shown in FIG. 4 taken substantially along the line 5—5.

DESCRIPTION OF THE PREFERRED EMBODIMENTS

Figure 1:
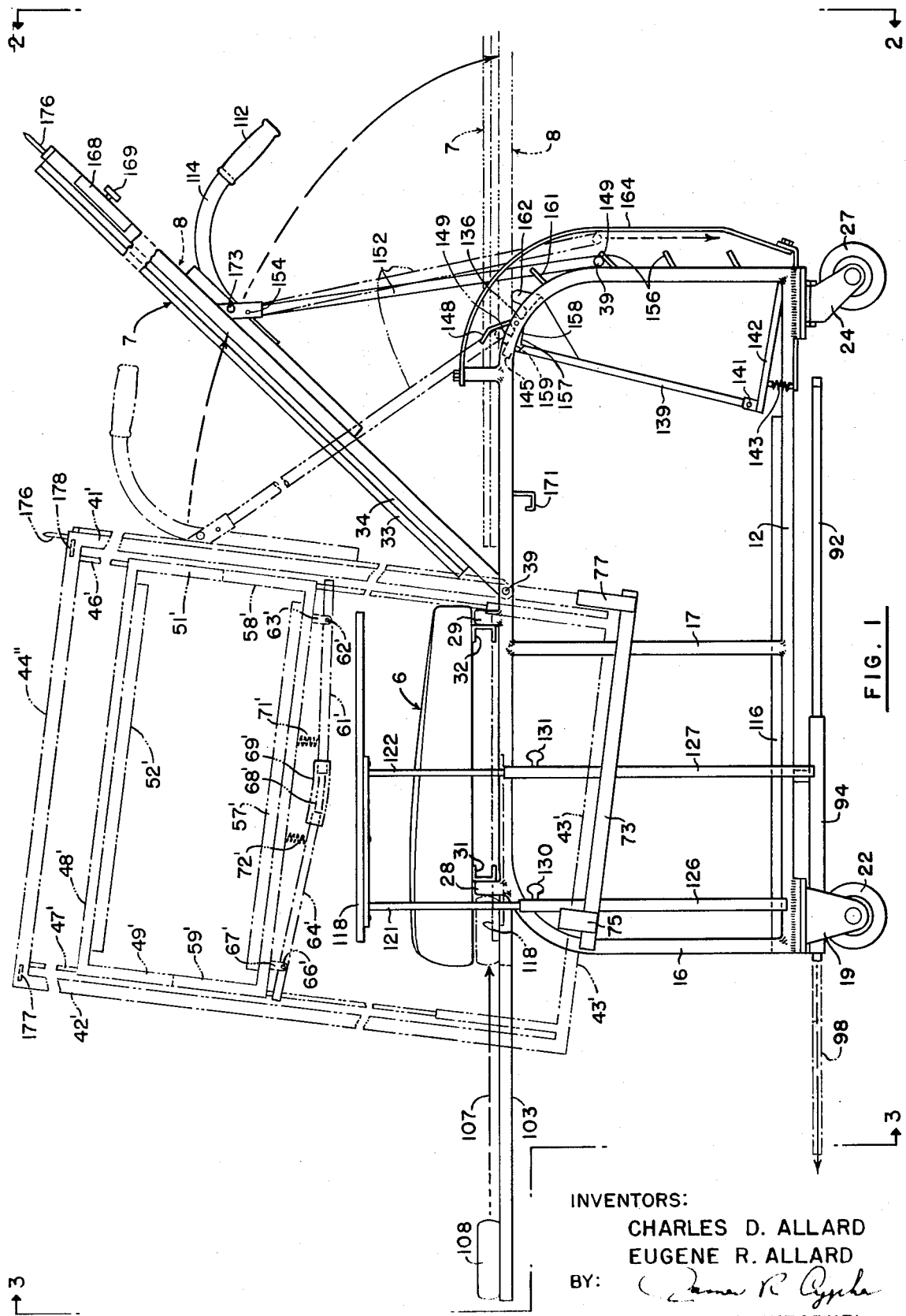
FIG. 1 is a side elevation view of a cassette holder constructed in accordance with the present invention removeably mounted on a mobile x-ray chair.

The mobile x-ray chair of the present invention consists briefly of a light weight frame having wheels mounted on the frame permitting guided movement of the unit; a seat 6 mounted on the frame for receiving a patient in a seated position; a back 7 mounted on the frame for supporting the back of the patient; first means mounted on the back for receiving a film cassette 8; a second means mounted on the frame adjacent the side of the seat for receiving a film cassette; and a third cassette holding means mounted on the frame adjacent the side of the seat opposite the second means.

The frame consists of side metal members 11 and 12, end members 13 and 14, and U-shaped upright members 15 and 16 connected thereto. Vertical members such as 17 and horizontal members give the necessary stability. Two mounting brackets 18 and 19 mounted to the bottom front of the frame carry fixed rubber wheels 21 and 22 and castors 23 and 24 mounted on the rear of the frame carry rubber wheels 26 and 27. The fixed and caster wheels may be mounted in reverse order as functional requirements require.

The seat is preferably padded for comfort and is mounted on cross members 28 and 29 affixed to the frame. Preferably the seat is elevated slightly above the frame members so that a film cassette can be slipped beneath the seat for taking x-rays of the pelvic region. The cassettes may be held conveniently by parallel channel members 31 and 32. The seat may be removably connected to the frame so that the patient may be lifted from the mobile unit in the seat. It is also possible to construct the seat with a hard smooth surface for taking hip x-rays.

The back member is preferably made with a hard smooth surface such as a plastic coated fiber board 33 with decorative surface, laminated to a pressed fiber board material 34. The back board is affixed to a tubular frame having side members 36 and 37 which are connected to the frame. It has been found that the optimum positioning of the back board for taking x-rays requires a tilt of 10° from the vertical. In transporting the patients, a tilt of 20° has been found to be more comfortable for many patients. To accommodate the two optimum positions, the back may be pivotally connected by connectors 38 and 39 to the frame.

The first means mounted on the chair back for holding a film cassette consists of vertical members 41 and 42 and cross members 43 and 44 connected to the frame members of the back. A pair of elongated members 46 and 47 mounted on the cassette frame in parallel spaced relationship serve as a slide. A slide member having a cross member 48 and side members 49 and 51 is mounted for sliding engagement on the elongated members and a channel member 52 connected to the cross member engages the upper edge 53 of a film cassette.

In order that the film cassette may be readily placed at different elevations, a second slide member is mounted laterally of the elongated members for selective sliding engagement thereon. This mechanism consists of a transverse member 56 bearing a channel member 57 for receiving the bottom edge of the film cassette. Side members 56 and 59 slidably engage the upright slide members. In order to lock the mechanism at an infinite number of positions along the slide members, there is a first arm 61 pivotally connected to the second slide member at pivot point 62 which is offset from the cross member by a short member 63 so that the arm is angularly related to the elongated member in a lock position and perpendicular to the elongated member in the slide position. In the end of each arm is an opening slightly larger than the cross section of the elongated member for frictional engagement therewith in the locking position. While a single arm would effectively lock the bottom slide member, it is preferable to use two arms for more secure holding and to keep the bottom edge more nearly parallel. Thus a second arm 64 is pivotally connected at point 66 and spaced from the cross arm by a short member 67 and has an opening in its end through which passes the elongated member. So that the arms can be moved simultaneously, a means is provided for hingedly connecting the inboard ends of the first and second arms. A practical means is to weld a short member 68 to one end of an arm and slide the other end into an opening in the inboard end of the other arm. To prevent the danger of pinching, a flexible tube can be placed so as to surround the short member particularly at the slip joint.

To insure that the lock mechanism will stay in the locked position, springs 71 and 72 are provided to bias the first and second arms to the lock position.

In order to take lateral x-rays of a patient without requiring him to move, a second means is mounted on the frame adjacent the side of the seat for receiving a film cassette. This means consists of a channel member 73 connected to the side of the frame in which the channel is wide enough to accommodate cassettes of varying widths such as the standard cassette and the special grid cassette. Connected to the channel are two pairs of upright members 74,75,76, and 77 which diverge at their upper ends to guide the cassette frame into the channel. In order to hold the upper end of the cassette frame, a protruding boss 79 is provided on the upper end of the back to register with an opening in a tab affixed to the cassette frame. The cassette frame in all other respects is the same as the cassette frame for the back. The cassette frame is shown in dotted lines in FIG. 1 and the parts are labeled as follows: vertical members 41' and 42', cross members 43' and 44' connected to the frame members, elongated members 46' and 47' mounted in parallel relation, a slide member having a cross member 48' and side members 49' and 51', a channel member 52' connected to the cross member to engage the upper edge of a film cassette, a second slide member consisting of a transverse member 56' having a channel member 57',184 side members 58' and 59'. a first arm 61' pivoted at point 62' on member 63', a second arm 64' connected at point 66' on member 67'. As set forth above, the arms are formed with openings which frictionally engage the parallel members when the arms are moved to an angle. The arms are connected by a short member 68' surrounded by a flexible tube 69'. Spring 71' and 72' bias the arms to the lock position.

Lateral x-rays can be taken from either side with the unit shown in the drawings. For this purpose, a channel 86 is connected to the frame and upright members 87,88,89, and 90 are provided with their upper ends diverging to receive the cassette frame. A third cassette is not shown as it would be identical in every respect to the second cassette above described.

A foot rest 92 is slidably mounted on channel members 93 and 94 suspended from the lower part of the frame by members 96 and 97. Arrow 98 shows the direction the foot rest is extended and the solid lines show the foot rest position in the normal position so that the chair can be stored in a compact form.

In the event an x-ray is to be taken of the leg of a patient while seated in the chair, a leg rest consisting of a U-shaped tubular member having a cross portion 101 and two elongated members 102 and 103, carried by channel members 105 and 106 carried by the frame beneath the seat can be slid out as in the position shown in FIG. 1. The leg rest can be stored by pushing it beneath the seat in the direction shown by arrow 107. Padding 108 may be added for comfort. If necessary, the film cassette may be placed directly on the elongated members beneath the legs of the patient.

The unit is readily pushed or pulled by manually engageable hand grips 111 and 112 frictionally attached to arms 113 and 114 connected to the back.

One of the very important features of the present invention is the fact that the frame is so constructed that a shelf 116 can be attached to the bottom to carry life support equipment such as oxygen bottles, emesis basin, vacuum bottles and other types of equipment which may be needed to sustain a patient while being transported to the x-ray room. There is sufficient room, in fact beneath the seat and the bottom shelf to build in shelves in which many small items may be stored for the patient in case of emergency or just for comfort. Facial tissue boxes, scissors, and many other implements can be readily stored.

Vertically adjustable arm rests are provided on both side of the seat and here consist of arm rests 117 and 118 carried by vertical support members 119, 120, 121, and 122. Adjustment is obtained by sliding the vertical supports withing box members 124, 125, 126 and 127. Threaded bolts on hand engageable knobs 128, 129, 130 and 131 fit into the threaded openings in the box members and bear against the vertical supports in friction engagement.

The unit shown in the drawings has a back which can be adjusted to various degrees for the comfort of the patient and can even be moved to the horizontal position for taking all the x-ray pictures one would normally take on a table. The adjusting means consists of a forked member 136 mounted at pivots 137 and 138 on the frame and movable from a fist rest position as shown in solid lines in FIG. 1 to a released position. Connected to the forked member is a lever arm 139 which may be operated by the foot by pivoting it at point 141, attaching a foot treadle 142 and inserting a spring 143 between the treadle and the frame. First fork arms 144 and 145 mounted on either end of the forked member move against stops or a part of the frame. The second arms 147 and 148 of the forked member engage a cross arm 149 connected to the distal ends of the struts 151 and 152. The struts are pivotally connected to the frame at points 153 and 154. A plurality of stop members 156 are located at various elevations on the frame to receive the cross arm. When the back is in the position shown in FIG. 1 shown in dotted lines, the back is preferably at a 10 degree angle. When the foot treadle is depressed, a link 157 connected to strap 158 at pivot 159 rotates the forked member in a clockwise direction as shown in FIG. 1. The cross arm is then moved forwardly and upwardly initially and then back and downwardly to one of the lower stop members. When the cross arm is resting on the stop designated 161 a movable stop member 162 holds the upper side of the cross arm so that the back cannot move forwardly if the mobile unit is suddenly stopped. Curved guides 163 and 164 prevent the cross arm from moving too far away from the frame.

One of the life support features of the present invention is the provision for adding fluids to the body during transport or the taking of x-rays. Accordingly, an I V pole 166 with a hook 167 is slidably held in channel 168 connected to the chair back and adjusted by threaded knob 169 received in a threaded opening in the channel to frictionally bear against the IV pole.

Another very useful attachment is a hook 171 attached to the frame which holds the catheter tube. The reservoir may be placed on the bottom shelf of the unit.

In transporting older people or patients subject to fainting, a safety strap is provided to support them. A belt with eyelets is often used and hooks into catches 172 and 173 at either side of the chair back.

In constructing the unit, the handles and the struts supporting the chair back may be either two pieces as shown or made from one piece of metal, shaped in the manner shown. Constructing the members in one piece greatly facilitates assembly.

Figure 2:
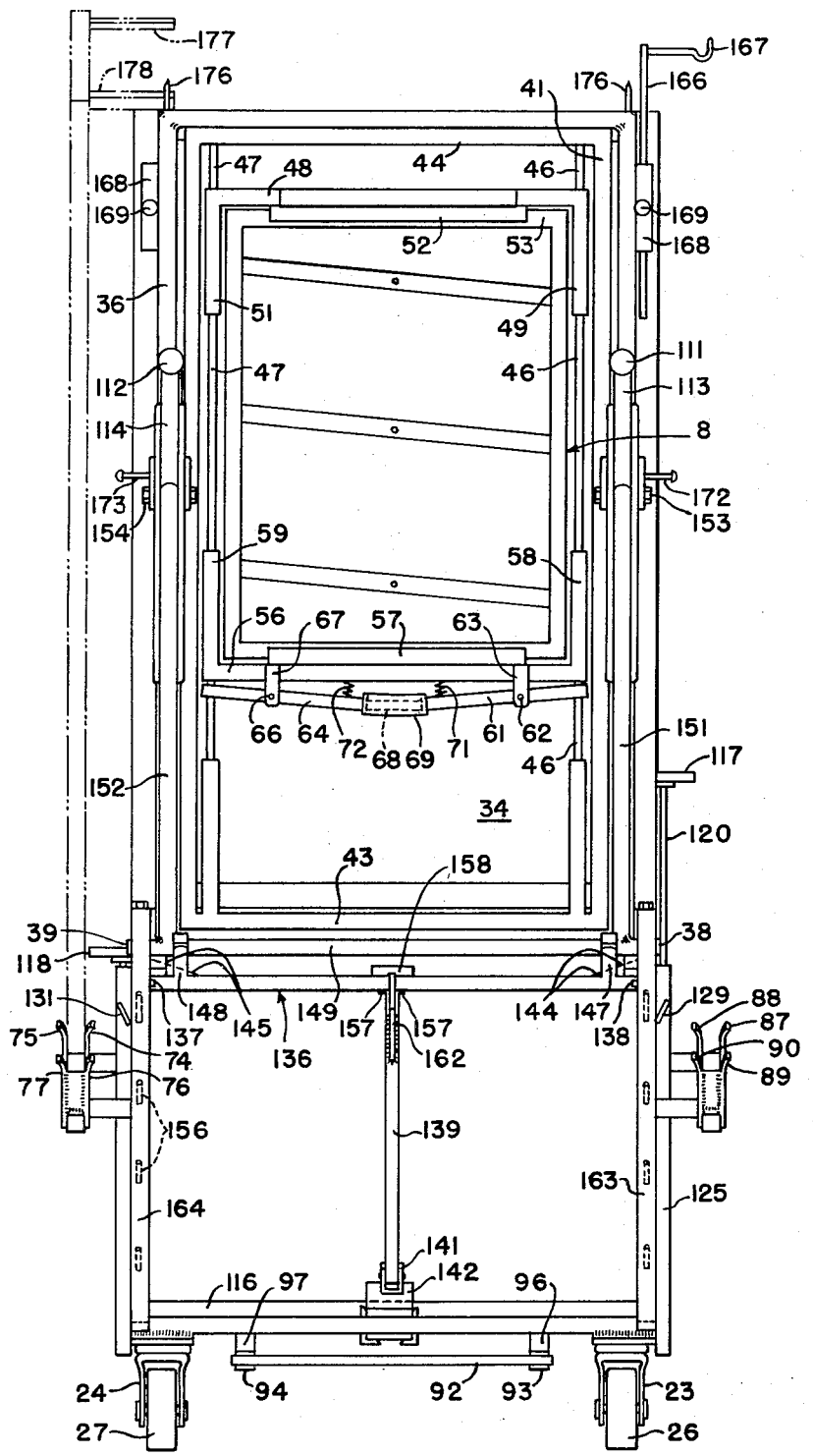
FIG. 2 is a rear elevation of the unit shown in FIG. 1 taken substantially along the line 2—2.
Figure 3:
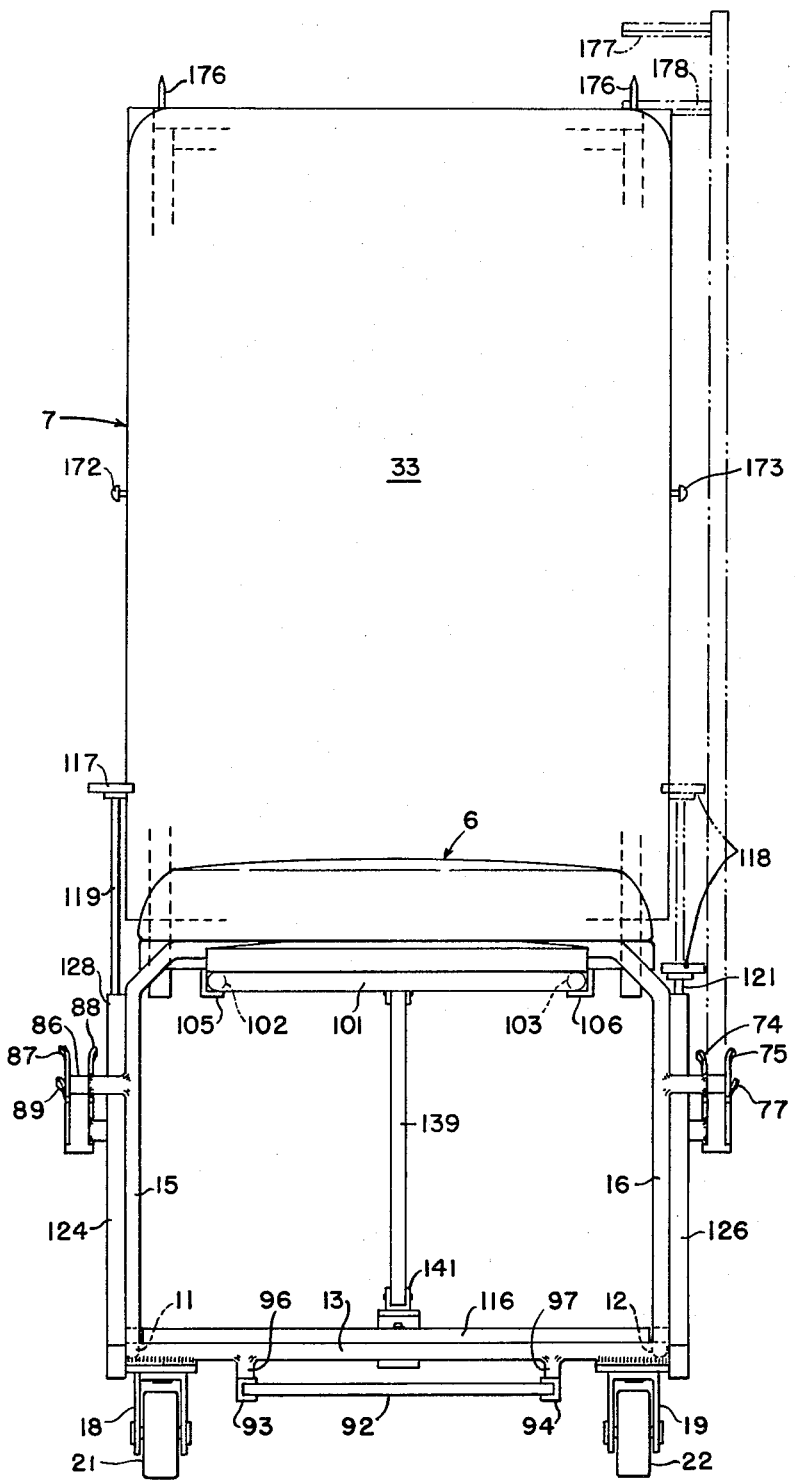
FIG. 3 is a front elevation of the unit shown in FIG. 1 taken substantially along the line 3—3.

In order to secure the film cassette to either side, a boss 176 is provided at the upper end of the chair as shown in FIGS. 1, 2 and 3. The boss registers with openings in respective tabs 177 and 178.

The following is a partial list of x-rays which may be taken while the patient is seated in the chair. As stated above, almost any type may be taken but the following have been found to be very easily performed.

| REGION | VIEWS |
|---|---|
| skull | A.P. lateral |
| | A.P. sub mento vertex |
| Facial bone | A.P. laterals |
| | A.P. obliques |
| | A.P. reverse waters |
| | A.P. sum mento vertex |
| Mandible | A.P. oblique lateral |
| cervical spine | A.P. obliques and laterals |
| clavicle | A.P. 15° cephalad |
| weight bearing for A/C joints | |
| Shoulder | A.P. trans thoracic lateral |
| humerus | A.P. trans throacic lateral |
| ribs | A.P. oblique |
| sternum | lateral |
| chest | A.P. obliques and laterals |
| abdomen | upright for free air |
| salivary gland | injection of contrast media and filming |
| bronchogram | anesthetizing of throat and drip method of administering contrast media |

In use, the patient is placed in the chair with his feet either held by the foot rest, or his legs supported by the foot rest. In the transporting position, the back is generally held at about a 20° position or if the patient cannot sit up, the back may be lowered to the horizontal or near horizontal. When the patient arrives at the x-ray department, the technician places the chair back in the 10 degree tilt position by depressing the foot treadle and pushing forward on the handles until he cross member approximates the desired position. The treadle is then released and the spring returns the forked member to the normal position. The back is then permitted to move slightly rearwardly until it is in the catch position.

The unit is then wheeled to a premarked position on the floor and the film cassettes are placed in the frames. The slidable portions of the frames are then moved to the proper height and the x-ray pictures may then be taken. The chair arm is of course removed before taking the picture.

When not in use, the foot and leg supports are slid inside the frame, the back is tilted up and the unit occupies a minimum of space. The units are inexpensive so that one or two may be stored on each floor of a hospital ready for instant use.

A modified form of the invention is shown in FIGS. 4 and 5. In general, the cassette holder shown in FIGS. 4 and 5 is identical to the holders shown in FIGS. 1 – 3, except for the fact that the frame is adapted for mounting on a wall. In addition, the cassette holder shown in FIGS. 4 and 5 is provided with means for holding a grid. Where parts in FIGS. 4 and 5 are identical, the part description is repeated from the earlier portions of the specification and the part is given the same number with a double prime mark ('') to indicate the modified form.

The cassette holder of FIGS. 4 and 5 consists briefly of vertical frame members 201 and 202 and cross members 43'' and 44'' connected to the frame members. Frame member 201, at its upper end 203 curves rearwardly and then transversely terminating in an end 204 with an opening 206 for receiving a headed screw 207 or other attachment means for connecting the holder to the wall or other upright means. The lower end of frame member 201 is bent rearwardly at portion 208, and then transversely at portion 209 where it terminates; providing an opening 211 for receiving screw 212.

Frame member 202 is also curved rearwardly at portion 213 and transversely at 214 providing opening 216 for a screw 217. The lower end of member 202 is curved rearwardly at portion 218 and then transversely at 219 providing an opening 221 for receiving screw 222.

A pair of elongated members 46'' and 47'' mounted on the cassette frame in parallel spaced relationship serve as a slide. A slide member having a cross member 48'' and side members 49'' and 51'' is mounted for sliding engagement on the elongated members and a channel member 52'' connected to the cross member engages the upper edge of a film cassette; (not shown).

In order that the film cassette may be readily placed at different elevations, a second slide member is mounted laterally of the elongated members for selective sliding engagement thereon. This mechanism consists of a transverse member 56'' bearing a channel member 57'' for receiving the bottom edge of the film cassette. Side members 58'' and 59'' slidably engage the upright slide members. In order to lock the mechanism at an infinite number of positions along the slide members, there is a first arm 61'' pivotally connected to the second slide member at pivot point 62'' which is offset from the cross member by a short member 63'' so that the arm is angularly related to the elongated member in a lock position and perpendicular to the elongated member in the slide position. In the end of each arm is an opening slightly larger than the cross section of the elongated member for frictional engagement therewith in the locking position. While a single arm would effectively lock the bottom slide member; it is preferable to use two arms for more secure holding and to keep the bottom edge more nearly parallel. Thus a second arm 64" is pivotally connected at point 66" and spaced from the cross arm by a short member 67" and has an opening in its end through which passes the elongated member. So that the arms can be moved simultaneously, a means is provided for hingedly connecting the inboard ends of the first and second arms. To prevent the danger of pinching, and to insure joint cooperation of the arms, a flexible tube is placed over the ends of each arm and is designated by the number 69".

To insure that the lock mechanism will stay in the locking position, springs 71" and 72" are provided to bias the first and second arms to the lock position.

To prevent wear of the device, bumpers 226 and 227 are provided at the tops of the slides and bumpers 228 and 229 at the bottom of the slides.

As an additional feature, a channel member 231 may be attached to the second slide member and a channel member 232 may be attached to the first slide member in order to hold a grid plate. This grid plate can be used for measuring and reference in interpreting the x-ray film. Since some film is already printed with a grid, the use of the grid is optional.

As an aid in sliding the upper slide, a handle 236 is connected to channel 52". Likewise, a handle member 237 is connected to channel 57".

Operation of the wall and chair mounted cassette holders is identical. Please refer to FIGS. 4 and 5 in following the operational description.

To mount the film cassette, the top edge of the film cassette is inserted into channel 52". The top slide mechanism slides without restriction and is pushed upwardly until the bottom edge of the film cassette is slightly above the channel 57" of the lower slide. The bottom edge of the film cassette is then dropped into the channel 57". After determining the height required for the film, the operator places his thumb on handle 237 and the tips of the fingers on the resilient sleeve 69". The sleeve is moved upwardly, thereby rotating arm 61" clockwise about pivot point 62", and arm 64" counterclockwise about pivot point 66". This action causes the side walls of opening 241 to frictionally release from member 46". As stated above, the diameter of opening 241 is slightly larger than the diameter of member 46". In like manner, the side walls of opening 242 frictionally release from member 47". The diameter of opening 242 is slightly larger than the diameter of member 46".

When the desired elevation of the film is reached, the fingers release the resilient sleeve 69" and springs 71" and 72" automatically push the arms in a direction counter to the direction just described. The sides of the openings 241 and 242 re-grip the members 46" and 47" and the film is locked in position ready for the x-ray to be taken.

Release of the film from the cassette holder is just as simple as inserting the film. The operator merely pushes the film cassette upwardly far enough for the bottom of the film to clear channel 57". The film is taken out and the top slide drops until the end 243 meets end 244.

We claim:

1. An x-ray film cassette holder for retaining a film cassette having upper and lower edges comprising:
    a. a rectangular frame having parallel sides connected to parallel bottom and top members;
    b. a pair of elongated members mounted on said frame in parallel spaced relationship inwardly of said rectangular frame sides;
    c. a first slide member mounted between said elongated members for sliding engagement thereon and having means for engaging the upper edge of a film cassette;
    d. a second slide member mounted between said elongated members for selective sliding engagement thereon and including;
        1. means for engaging the bottom edge of said film cassette,
        2. locking means comprising:
            1. a first arm pivotally connected to said second slide member and movable from a lock position angularly related to said elongated members and a slide position generally perpendicular to said elongated members, and having an opening in an end slightly larger than the cross section of one of said elongated members for frictional engagement therewith in the locking position;
            2. a second arm as described in subparagraph (1) above pivotally connected to said second slide member for selective engagement with the opposite elongated member; and
            3. means hingedly connecting the inboard ends of said first and second arms for joint movement of said arms.

2. An x-ray film cassette holder as described in claim 1 comprising:
    a. spring means mounted on said second slide member and biasing said first and second arm members to said lock position.

3. An x-ray film cassette holder as described in claim 2 comprising:
    a. said means hingedly connecting the inboard ends of said first and
    second arms consisting of a resilient sleeve frictionally retained on the ends of said arms and having sufficient rigidity to impose conjoint movement of said arms upon manual movement of said sleeve.

4. An x-ray film cassette holder as described in claim 3 comprising:
    a. hand engageable means consisting of a member connected to said second slide member located above said sleeve member and within a hand width thereof so that said locking means can be disengaged and engaged and said first and second slide members raised and lowered with one hand.

5. An x-ray film cassette holder as described in claim 1 comprising:
    a. a channel member connected to said first slide member for engaging the top edge of a grid plate; and
    b. a channel member connected to said second slide member for engaging the bottom edge of said grid plate.

6. An x-ray film cassette holder as described in claim 1 comprising:
    a. said rectangular frame being adapted for registration with a holder attached to a mobile x-ray chair for carrying said cassette holder.

7. An x-ray film cassette holder as described in claim 1 comprising:

a. said frame being provided with laterally extending members adapted for holding said frame at a preselected distance from a vertical wall; and
b. fastening means adapted for connecting said extension members to said wall.

* * * * *